US008914189B2

(12) United States Patent
Kraeling et al.

(10) Patent No.: US 8,914,189 B2
(45) Date of Patent: Dec. 16, 2014

(54) SYSTEM AND METHOD FOR COMMUNICATIONS IN A VEHICLE CONSIST

(71) Applicant: General Electric Company, Schenectady, NY (US)

(72) Inventors: Mark Bradshaw Kraeling, Melbourne, FL (US); Wolfgang Daum, Erie, PA (US); Todd William Goodermuth, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 13/827,083

(22) Filed: Mar. 14, 2013

(65) Prior Publication Data
US 2014/0058623 A1 Feb. 27, 2014

Related U.S. Application Data

(60) Provisional application No. 61/692,413, filed on Aug. 23, 2012.

(51) Int. Cl.
*G06F 19/00* (2011.01)
*G07C 5/00* (2006.01)
*B61K 13/00* (2006.01)
*B61L 15/00* (2006.01)
*H04L 12/40* (2006.01)

(52) U.S. Cl.
CPC ....... *B61K 13/00* (2013.01); *H04L 2012/40293* (2013.01); *H04L 12/40* (2013.01); *B61L 15/0036* (2013.01)
USPC ....................................................... 701/34.4

(58) Field of Classification Search
CPC . B61K 13/00; B61L 2205/00; B61L 2205/02; B61L 2027/00; B61L 2027/005
USPC ........................................................ 701/34.4
See application file for complete search history.

(56) References Cited

U.S. PATENT DOCUMENTS

2011/0270475 A1 11/2011 Brand et al.
2012/0263179 A1 10/2012 Shigeeda

FOREIGN PATENT DOCUMENTS

EP 2139171 A1 12/2009
EP 2219325 A1 8/2010
(Continued)

OTHER PUBLICATIONS
International Search Report and Written Opinion issued in connection with corresponding PCT Application No. PCT/US2013/051609 on Nov. 19, 2013.

(Continued)

*Primary Examiner* — Mary Cheung
*Assistant Examiner* — Anne Mazzara
(74) *Attorney, Agent, or Firm* — GE Global Patent Operation; John A. Kramer

(57) ABSTRACT

A method includes determining a state of operational devices in a second group coupled with a second router onboard a second vehicular unit of a vehicle consist, registering an operational device in the second group based on the determined state, and transmitting a data message from an operational device in a first group of operational devices to the second router via a first router and a communication pathway of the vehicle consist. The first group is coupled with the first router onboard a first vehicular unit. The operational devices in the first and second groups perform functions of the respective first vehicular unit and second vehicular unit. The first and second routers are connected with each other by the communication pathway. The method also includes communicating the data message to the at least one of the operational devices in the second group that are registered with the second router.

27 Claims, 6 Drawing Sheets

(56) References Cited

FOREIGN PATENT DOCUMENTS

| EP | 2263905 | A1 | 12/2010 |
| EP | 2383162 | A1 | 11/2011 |
| EP | 2383938 | A1 | 11/2011 |
| WO | 2011129088 | A1 | 10/2011 |

OTHER PUBLICATIONS

Liu et al., "The Study of Maglev Train Control and Diagnosis Networks Based on Role Automation Decentralization", IEICE Transactions on Information and Systems, Information & Systems Society, Volume No. E91D, Issue No. 9, pp. 2285-2292, Sep. 1, 2008.

500

| Device | Registration Message Received? | Address |
|---|---|---|
| 1 | Y | 12345 |
| 2 | N | |
| 3 | Y | 23456 |
| 4 | Y | 34567 |

| Device | Registration Message Received? | Address |
|---|---|---|
| 5 | N | |
| 6 | Y | 23456 |
| 7 | Y | 65432 |
| 8 | Y | 76543 |

FIG. 6

SYSTEM AND METHOD FOR COMMUNICATIONS IN A VEHICLE CONSIST

CROSS-REFERENCE TO RELATED APPLICATIONS

This application claims priority to U.S. Provisional Application No. 61/692,413, filed 23 Aug. 2012, and entitled "System And Method For Communications In A Vehicle Consist," the entire disclosure of which is incorporated by reference.

TECHNICAL FIELD

Embodiments of the subject matter described herein relate to data communications. Other embodiments relate to network communications in a vehicle consist.

BACKGROUND

A vehicle "consist" is a group of vehicles that are mechanically coupled to travel together along a route. For example, a train is a type of vehicle consist comprising a group of rail vehicles coupled together to travel along a track. Similarly, a locomotive consist is a group of two or more locomotives that are coupled together, as part of a larger train or otherwise. Trains may have one or more locomotive consists. Locomotives in a locomotive consist include a lead locomotive and one or more trail locomotives. A train may have a lead consist, and may also have one or more remote consists positioned further back in the train. Alternatively or additionally, some trains may have single locomotives positioned within the train and separated from other locomotives by one or more non-locomotive rail cars (e.g., cargo or passenger cars).

In a locomotive consist, each locomotive includes a connection at each end of the locomotive to couple the power and brake systems of the locomotive to adjacent locomotives such that they function together as a single unit. Each locomotive is connected to subsequent locomotives via a port and jumper cable that includes twenty seven pins on each end. This cable is commonly referred to in the industry as a multiple unit cable or "MU" cable. Two or more of the locomotives in a consist may each include an on-board controller or other electronics. In certain cases, it may be desirable to link the on-board electronics together as a computer network, such that electronics of the lead locomotive in the consist can communicate with electronics of the trail locomotives. This intra-consist network may allow for inherent redundancies in locomotive electronics to be used to improve reliability of locomotives by allowing lead locomotives to utilize electronic equipment contained in trail locomotives of the same consist. It may be easier and more cost effective to use remote electronics in a trail locomotive than providing redundant equipment on each locomotive.

Communications in a vehicle consist have been realized using a number of methods. A first involves wireless communications between the vehicles in the consist using radio equipment. A second method involves running dedicated network cables between the linked locomotives in a consist. A third method involves Ethernet over MU communications between the vehicles in the consist, utilizing an existing locomotive MU cable bus that interconnects the lead locomotive and the trail locomotives. The MU cable bus is an existing electrical bus that is used in the locomotive consist for transferring non-network control information between the lead locomotive and the trail locomotives. (MU "cable bus" refers to the MU cable jumper that actually interconnects adjacent locomotives and/or to the internal electrical system that connects the cable jumper to internal locomotive electronics and the MU ports on either end of a locomotive.)

In some systems, operational devices that perform various functions for the vehicle consist are networked with different routers. The routers are then connected with each other, such as through the MU cable bus. The devices can communicate with each other via the routers and the cable bus. For example, a first device can send data to a first router, which sends the data to a second router, which then sends the data to a second device. In order for the devices to communicate with the routers, the devices are associated with the routers, such as by registering the devices with the routers. But, no check on the health or status of the devices may be performed prior to registering the devices with the routers, and no re-evaluations of the health or status may be performed after the devices are registered. As a result, faulty devices may continue to be registered with routers such that data is communicated to the faulty devices, even though these devices may be unable to process the data.

Although systems exist for network communications in vehicle consists, existing systems may not provide reliable or efficient methods for establishing such communications. Accordingly, it may be desirable to have a vehicle consist communication system and/or method that differ in function from those systems that are currently available.

BRIEF DESCRIPTION

In one embodiment, a method (e.g., for communicating in a vehicle consist) includes determining a state of one or more operational devices in a second group of operational devices. The second group of operational devices is coupled with a second router disposed onboard a second vehicular unit of a vehicle consist. The method also includes registering at least one of the operational devices in the second group with the second router based on the state that is determined and transmitting a data message from at least one operational device in a first group of operational devices to the second router via a first router and a communication pathway of the vehicle consist. The first group of operational devices is coupled with the first router disposed onboard a first vehicular unit of the vehicle consist. The operational devices in the first and second groups are configured to perform one or more functions of the respective first vehicular unit and second vehicular unit. The first and second routers are connected with each other by the communication pathway. The method also includes communicating the data message to the at least one of the operational devices in the second group that are registered with the second router.

In another embodiment, a method (e.g., for communicating in a vehicle consist) includes determining a state of an operational device that is coupled with a first router disposed onboard a first vehicular unit of a vehicle consist. The operational device is configured to perform one or more functions of the first vehicular unit. The first router is connected with a second router disposed onboard a second vehicular unit of the vehicle consist by a communication pathway of the vehicle consist. The method also includes registering the operational device with the first router when the state indicates that the operational device can perform the one or more functions, receiving a data message at the first router from the second router via the communication pathway, and communicating the data message to the operational device when the operational device is registered with the first router.

In one aspect, the state may indicate that an operational device can perform the one or more functions even at less than full capacity of the operational device. For example, the operational device can perform the one or more functions when the operational device performs the functions in some reduced capacity that is still greater than not performing the functions at all.

In one embodiment, a system (e.g., a communication system of a vehicle consist) includes first and second routers. The first router is configured to be coupled with a first group of operational devices disposed onboard a first vehicular unit of a vehicle consist. The first group of operational devices is configured to perform one or more functions of the first vehicular unit. The second router is configured to be coupled with a second group of operational devices disposed onboard a second vehicular unit of the vehicle consist. The second group of operational devices is configured to perform one or more functions of the second vehicular unit. The first and second routers are configured to be connected with each other by a communication pathway of the vehicle consist. The second router is configured to determine a state of one or more of the operational devices in the second group and to register at least one of the operational devices in the second group with the second router based on the state that is determined. The first router is configured to transmit a data message from at least one of the operational devices in the first group to the second router via the communication pathway and the second router is further configured to communicate the data message to the at least one of the operational devices in the second group that are registered with the second router.

In another embodiment, a system (e.g., a communication system for a vehicle consist) includes a first router configured to be disposed onboard a first vehicular unit of the vehicle consist and to be coupled with an operational device that is configured to perform one or more functions of the first vehicular unit. The first router is configured to be connected with a second router disposed onboard a second vehicular unit of the vehicle consist by a communication pathway of the vehicle consist. The first router also is configured to obtain a state of the operational device, register the operational device when the state indicates that the operational device can perform the one or more functions, receive a data message from the second router via the communication pathway, and communicate the data message to the operational device when the operational device is registered.

In another embodiment, a method (e.g., for communicating in a vehicle consist) includes determining a state of a first operational device disposed onboard a first vehicular unit of a vehicle consist. The state is indicative of at least one of a health of the first operational device, a status of the first operational unit, or a capability of the first operational unit to perform one or more functions of the first vehicular unit. The method also includes reporting the state of the first operational device to a first router that is connected with the first operational device. The first router is communicatively coupled with a second router disposed on a second vehicular unit of the vehicle consist by a communication pathway. The method also includes, at the first operational device, receiving a data message that is communicated from the second router to the first router when the first operational device is registered with the first router. The first operational device is registered based on the state of the first operational device.

In any of the embodiments set forth herein, data transmitted over the MU cable bus or other communication means may be used for locomotive or other vehicle control, such as controlling the locomotive or other vehicle for movement along a route. While this Ethernet over MU communications system may be utilized in connection with the embodiments of the inventive subject matter described below, the embodiments are not limited to use with an Ethernet over MU system. In particular, the embodiments of the inventive subject matter described below may also be employed and utilized in connection with a wireless communications system such as one using radio equipment to facilitate communication between locomotives in the consist. In addition, the embodiments described below may also be used with a communication system that utilizes dedicated network cables between the linked locomotives in a consist.

BRIEF DESCRIPTION OF THE DRAWINGS

The subject matter described herein will be better understood from reading the following description of non-limiting embodiments, with reference to the attached drawings, wherein below:

FIG. 5 illustrates an example of a registration list of a router shown in FIG. 4;

FIG. 6 illustrates an example of another registration list of another router shown in FIG. 4;

DETAILED DESCRIPTION

Figure 1:
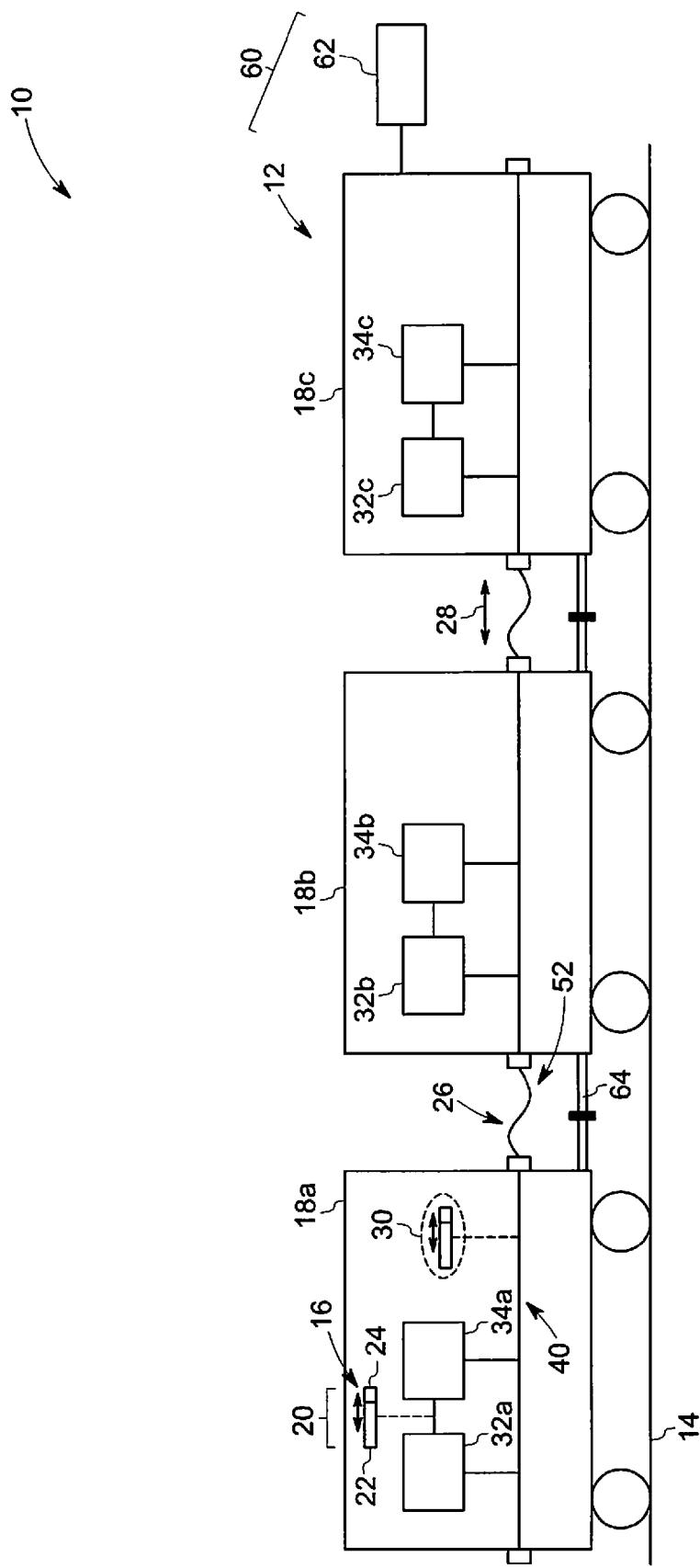
FIG. 1 illustrates one embodiment of a communication system for communicating network data in a vehicle consist.

Embodiments of the inventive subject matter relate to communication systems and methods for a vehicle consist comprising a plurality of vehicles. For example, according to one aspect, two or more vehicles in the vehicle consist are linked in a data network. Network data is communicated between the linked vehicles. The network data may be used for a variety of functions, including (but not limited to) managing services and devices deployed on the vehicles throughout the consist. With respect to a locomotive consist, the network data may be communicated between the locomotives to allow for the locomotives to coordinate the tractive efforts and/or braking efforts provided by the locomotives (e.g., to base the efforts on the efforts of other locomotives in the same consist) and/or to remotely control the tractive efforts, braking efforts, or other operations of one or more locomotives from a lead locomotive.

Reference will be made below in detail to embodiments of the inventive subject matter, examples of which are illustrated in the accompanying drawings. Wherever possible, the same reference numerals used throughout the drawings refer to the same or like parts. Although embodiments of the inventive subject matter are described with respect to trains, locomotives, and other rail vehicles, embodiments of the inventive subject matter also are applicable for use with vehicles generally, such as off-highway vehicles, agricultural vehicles, transportation vehicles, and/or marine vessels, each of which may be included in a vehicle consist. As noted above, a vehicle consist (e.g., locomotive consist) is a group of vehicles (e.g., locomotives) that are mechanically coupled or linked together to travel along a route, with each vehicle in the consist being adjacent to one or more other vehicles in the consist.

FIG. 1 illustrates one embodiment of a communication system 10 for communicating network data in a vehicle consist 12. The consist 12 may be configured to travel along a route 14, such as a railway, road, waterway, and the like. In the system 10, network data 16 is transmitted from one vehicular unit 18a in the consist 12 (e.g., a lead locomotive 18a or first vehicle capable of generating propulsive force to propel itself along the route 14) to one or more other vehicular units 18b, 18c in the consist 12 (e.g., a trail locomotive 18b and/or 18c, or other vehicles capable of generating propulsive force). Each vehicular unit 18a-18c is adjacent to and mechanically coupled with another vehicular unit in the consist 12 such that all vehicular units 18 in the consist 12 are connected (directly or indirectly by way of one or more other vehicular units, such as units that are not capable of generating propulsive force).

In one embodiment, "network data" 16 refers to data that is packaged in packet form, meaning a data packet that comprises a set of associated data bits 20, e.g., Ethernet-formatted data packets. (Each data packet may include a data field 22 and a network address or other address 24 uniquely or otherwise associated with a computer unit or other electronic component in the consist 12.) The network data 16 is transmitted over an MU cable bus 26. The MU cable bus 26 is an existing electrical bus interconnecting the vehicular unit 18a and the vehicular units 18b, 18c in the consist 12. The MU cable bus 26 can be used in the consist 12 for transferring non-network control information 28 between vehicular units 18 in the consist 12. "Non-network" control information 28 refers to data or other information, used in the consist 12 for control purposes, which is not packet data. In another aspect, non-network control information 28 is not packet data, and does not include recipient network addresses.

Figure 2:
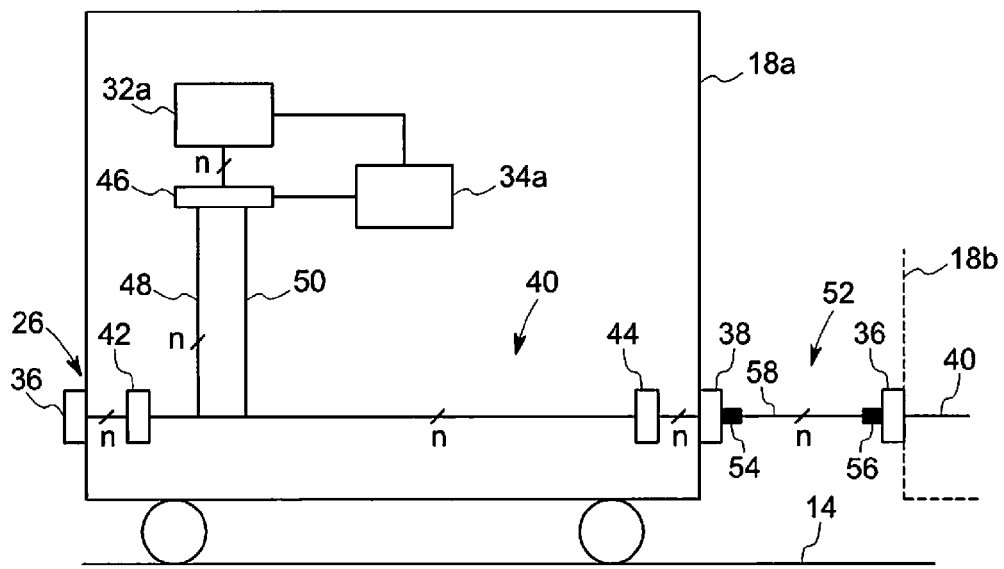
FIG. 2 illustrates one example of a multiple unit (MU) cable bus.
Figure 3:
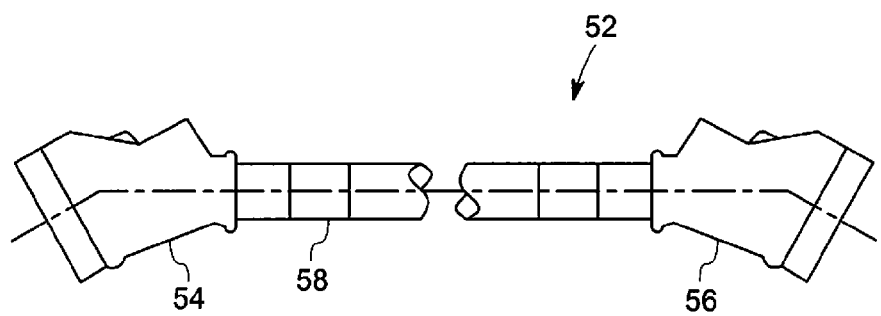
FIG. 3 illustrates the MU cable bus shown in FIG. 2.

FIGS. 2 and 3 illustrate one example of the MU cable bus 26. Other configurations are possible, depending on the type of locomotive involved. The MU cable bus 26 can be an existing electrical bus interconnecting the vehicular unit 18a and the vehicular units 18b, 18c in the consist 12. In each vehicular unit 18, the MU cable bus 26 comprises a front MU port 36, a rear MU port 38, and an internal MU electrical system 40 that connects the front port 36 and the rear port 38 to one or more operational/electronic components 32a of the vehicular unit 18. In the illustrated example, the internal MU electrical system 40 comprises a front terminal board 42 electrically connected to the front MU port 36, a rear terminal board 44 electrically connected to the rear MU port 38, a central terminal board 46, and first and second electrical conduit portions 48, 50 electrically connecting the central terminal board 46 to the front terminal board 42 and the rear terminal board 44, respectively. The one or more electronic components 32a of the vehicular unit 18 may be electrically connected to the central terminal board 46, and thereby to the MU cable bus 26 generally. Although the front MU port 36 and rear MU port 38 may be located generally at the front and rear of the locomotive 18a, this is not always the case, and designations such as "front," "rear," "central," etc. are not meant to be limiting but are instead provided for identification purposes.

As shown in FIGS. 2 and 3, the MU cable bus 26 further comprises an MU cable jumper 52. The jumper 52 comprises first and second plug ends 54, 56 and a flexible cable portion 58 electrically and mechanically connecting the plug ends together. The plug ends 54, 56 fit into the MU ports 36, 38. The MU cable jumper 52 may be electrically symmetrical, meaning either plug end can be attached to either port. The MU cable jumper 52 is used to electrically interconnect the internal MU electrical systems 40 of adjacent vehicular units, e.g., vehicular unit 18a and vehicular unit 18b. As such, for each adjacent pair of vehicular units 18a, 18b, one plug end 54 of an MU cable jumper 52 is attached to the rear MU port 28 of the front vehicular unit 18a, and the other plug end 56 of the MU cable jumper 52 is attached to the front MU port 36 of the rear vehicular unit 18b. The flexible cable portion 58 of the MU cable jumper 52 extends between the two plug ends, providing a flexible but secure electrical connection between the two vehicular units 18a, 18b.

Depending on the particular type and configuration of the vehicular units 18, the electrical conduit portions 48, 50 and MU cable jumpers 52 may be configured in different manners, in terms of the number "n" ("n" is a real whole number equal to or greater than 1) and type of discreet electrical pathways included in the conduit or jumper. In one example, each conduit portion 48, 50 and the jumper cable portion 58 comprises a plurality of discreet electrical wires, such as 12-14 gauge copper wires. In another example, the cable portion 58 (of the MU cable jumper 52) comprises a plurality of discreet electrical wires, while the conduit portions 48, 50 each include one or more discreet electrical wires and/or non-wire electrical pathways, such as conductive structural components of the vehicular unit, pathways through or including electrical or electronic components, circuit board traces, or the like. Although certain elements in FIG. 2 are shown as including "n" discreet electrical pathways, it should be appreciated that the number of discreet pathways in each element may be different, i.e., "n" may be the same or different for each element.

As noted, the plug ends 54, 56 of the MU cable jumper 52 fit into the MU ports 36, 38. For this purpose, the plug ends and MU ports are complementary in shape to one another, both for mechanical and electrical attachment. The plug end 54, 56 may include a plurality of electrical pins, each of which fits into a corresponding electrical socket in an MU port. The number of pins and sockets may depend on the number of discreet electrical pathways extant in the internal electrical conduits 40, MU cable jumpers 52, etc. In one example, each plug end 54, 56 is a twenty seven-pin plug.

The central terminal board 46, front terminal board 42, and rear terminal board 44 each comprise an insulating base (attached to the vehicular unit) on which terminals for wires or cables have been mounted. This provides flexibility in terms of connecting different electronic components to the MU cable bus.

The term "MU cable bus" refers to the entire MU cable bus or any portion(s) thereof, e.g., terminal boards, ports, jumper cable, conduit portions, and the like. As should be appreciated, when two vehicular units are connected via an MU cable jumper 52, both the MU cable jumper 52 and the internal MU electrical systems 40 of the two vehicular units together form the MU cable bus. As subsequent vehicular units are attached using additional MU cable jumpers 52, those cable jumpers and the internal MU electrical systems 40 of the subsequent locomotives also become part of the MU cable bus.

As indicated in FIG. 1, the vehicle consist 12 may be part of a vehicle system 60, such as a train, that includes the consist 12, a plurality of other vehicular units 62 (e.g., vehicular units that do not generate propulsive force, such as railcars), and possibly additional vehicular units or vehicle consists (not shown). Each vehicular unit 18a-18c in the consist 12 is mechanically coupled to at least one other, adjacent vehicular unit in the consist 12, through a coupler 64. The other vehicular units 62 are similarly mechanically coupled together and to the consist to form a series of linked vehicles. The non-network control information may be used for vehicular unit control purposes or for other control purposes in the system 60.

The communication system 10 may comprise respective router transceiver units 34a, 34b, 34c positioned in the vehicular units 18. The router transceiver units 34a, 34b, 34c are each electrically coupled to the MU cable bus 26. The router transceiver units 34a, 34b, 34c are configured to transmit and/or receive network data 16 over the MU cable bus 26.

The communications system 10 shown in FIG. 1 is intended to be illustrative of a communications system that may be utilized in connection with the embodiments of the inventive subject matter described herein. While this Ethernet over MU communications system (that utilizes an existing multiple unit (MU) cable bus that interconnects the vehicular units) may be utilized in connection with the embodiments of the inventive subject matter described below, the embodiments are not limited to use with an Ethernet over MU system. In particular, the embodiments may also be employed and utilized in connection with a wireless communications system such as one using radio equipment to facilitate communication between vehicular units in the consist. In addition, the embodiments described below may also be used with a communication system that utilizes dedicated network cables between the linked vehicular unit in a consist.

In one embodiment, a system and method for routing data between vehicular units in a vehicle consist are provided. The data is routed between various devices disposed onboard the vehicular units. For example, data from a first device (e.g., a GPS receiver) on a first vehicular unit can be routed to a second device on a second vehicular unit (e.g., an energy management system that automatically controls the second vehicular unit or suggests controls to an operator of the second vehicular unit in order to reduce fuel consumed and/or emissions generated by the second vehicular unit). In order to route the data, the first device sends the data to a first router disposed onboard the first vehicular unit. The first router has the network address (e.g., an IP address) of a second router disposed onboard the second vehicular unit. For example, the routers may be networked with each other through the MU cable bus or another communication medium (e.g., another conductive pathway, wireless connection, and the like), with the routers identified by unique network addresses, such as IP addresses, in order to facilitate communication with specifically addressed routers. The first router sends the data to the second router, which then conveys the data to the second device.

Groups of devices on the vehicular units may be linked with different routers. For example, the devices onboard a first vehicular unit may be linked with a first router of the first vehicular unit by a first local network (e.g., a local area network, or LAN), the devices onboard a second vehicular unit may be linked with a second router of the second vehicular unit by a second local network, and the like. The routers are connected with each other in a network through the MU cable bus. In order for the routers to determine which devices are connected to the routers in the local networks, the devices are registered with the routers. For example, the identity and/or presence of the devices can be provided to the routers, and addresses (e.g., static or dynamic IP addresses) can be assigned to the devices by the routers or by another component. These addresses of the devices and of the routers are used to accurately communicate the data within the networks.

During operation, one or more devices may cease to function, such as due to damage, decreased health, and the like, and/or may erroneously perform operations, such as by providing inaccurate sensor readings. The continued use of such devices may not be desirable for safe operation of the vehicle consist. In order to prevent the use of such devices, the devices can perform self-assessments of the health (e.g., functionality or ability to perform the operations of the devices) of the devices and, based on this self-assessment, the devices can determine whether to register with the local router (e.g., the router onboard the same vehicular unit) or to not register with the local router. Devices that register with the router can continue to send and/or receive data with other devices via the router. Devices that do not register with the router do not send and/or receive data with other devices via the router. Additionally or alternatively, an assessment device may examine the devices and determine the states of health or functionality of the devices. Based on this examination, the assessment device may direct the devices to register or not register with the router, and/or inform the router of the devices that should be not registered so that the router can de-register the devices. The router can register the devices by assigning an address to the devices so that data can be communicated with the registered devices through the router. The router can de-register (or not register) the devices such that data is not communicated to the devices or data received from the devices is not communicated to other devices.

In one embodiment, the devices have dynamic or static IP addresses with the local routers. These addresses may need to be known by the router in order to communicate with the devices. The devices can send registration messages to the router in order to register the devices with the router. The devices can use these registration messages to make self-assessments on whether or not data should be routed to or from the devices. The self-assessment can be performed autonomously, and may be based on factors that are unique to the device or type of device, such as the health, status, ability to perform assigned job function of the device, and the like. For those devices that determine that the devices can perform the assigned functions, the devices can inform the router of the identities of the devices so that the devices are registered with the router.

Figure 4:
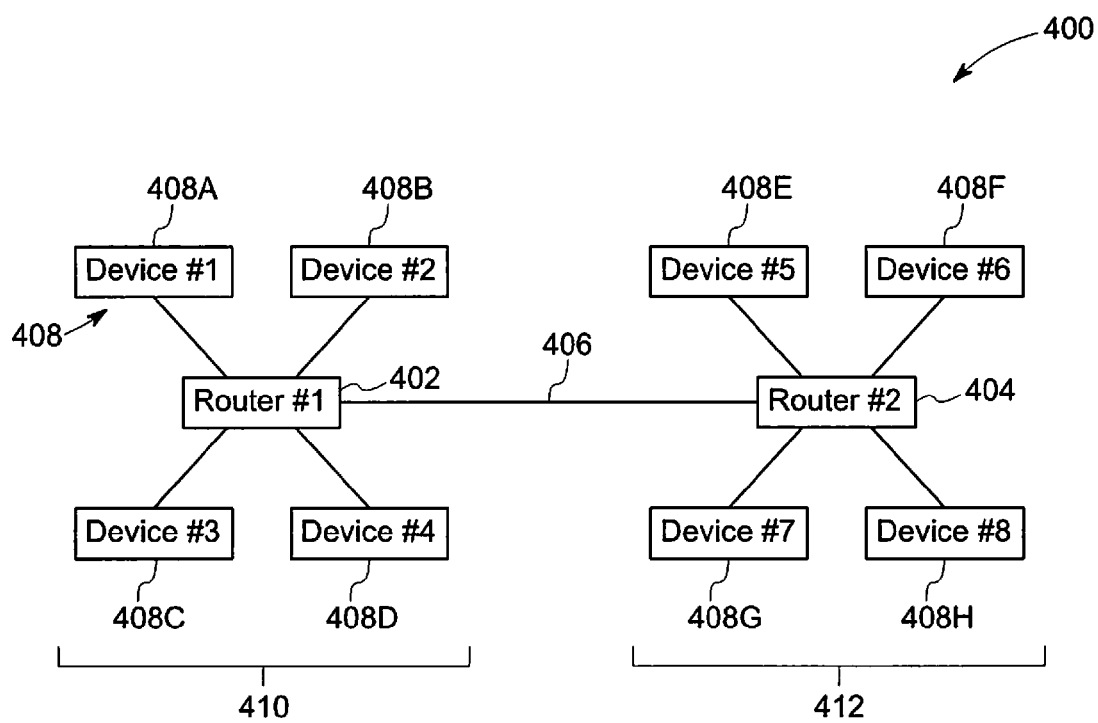
FIG. 4 is a schematic illustration of one embodiment of a communication system for a vehicle consist.

FIG. 4 is a schematic illustration of one embodiment of a communication system 400 for a vehicle consist. The system 400 may be disposed onboard the vehicle consist 12 shown in FIG. 1 in order to permit communication of data (e.g., network and/or non-network data in messages communicated in the system 400) between the vehicular units 18 (shown in FIG. 1) of the consist 12. The system 400 includes first and second routers 402, 404 (shown as "Router #1" and "Router #2," respectively, in FIG. 4). The routers 402, 404 may be separately disposed onboard different vehicular units, such as the vehicular units 18a, 18b. The routers 402, 404 are linked with each other by a communication pathway 406, such as the MU cable bus 26. Alternatively, the communication pathway 406 may be another conductor or a wireless network. The routers 402, 404 may be communicatively coupled with each other in a network. For example, the routers 402, 404 may be assigned unique addresses, such as different IP addresses, to allow for data messages to be communicated with the routers 402, 404 over the communication pathway 406 in the network. By "communicatively coupled," it is meant that the routers 402, 404 are connected with each other such that the routers 402, 404 can communicate data messages with each other via one or more communication pathways, such as conductive buses, wires, wireless networks, and the like. The term "coupling" with respect to the routers can include the routers exchanging data signals with each other and/or one or more other devices such that communications are established between the routers and/or devices.

While only two routers 402, 404 are shown, alternatively, a greater number of routers may be included in the system 400 and communicatively coupled with each other, such as by the pathway 406.

Each router 402, 404 is communicatively coupled with one or more devices. For example, the router 402 is communicatively coupled with operational devices 408A-D (shown as "Device #1," "Device #2," "Device #3," and "Device #4," respectively, in FIG. 4). The router 404 is communicatively coupled with devices 408E-H (shown as "Device #5," "Device #6," "Device #7," and "Device #8," respectively, in FIG. 4). By "communicatively coupled," it is meant that the routers 402, 404 are connected with the devices 408 such that the routers 402, 404 and devices 408 can communicate data messages with each other via one or more communication pathways, such as conductive buses, wires, wireless networks, and the like. The devices 408 can represent a variety of components on the vehicle consist 12 that are used in operation (e.g., travel) of the vehicle consist 12. As way of example only, the devices 408 can represent GPS receivers, radios, sensors, control units (e.g., devices that are used to control tractive and/or braking efforts of the vehicular units in the consist), transceivers, and the like.

The devices 408 may be connected with the respective routers 402, 404 in local networks, such as LANs. For example, the devices 408A-D are connected with the router 402 in a first local network 410 and the devices 408E-H are connected with the router 404 in a second local network 412.

The devices 408 can communicate with each other via the routers 402, 404. The devices 408A-D can communicate with the devices 408E-H by transmitting messages to one of the routers 402, 404, which then conveys the messages to the other router 404, 402, which then communicates the message to the addressed recipient device 408. For example, the device 408A can transmit a message to the device 408E by communicating the message to the router 402, which transmits the message to the router 404, which transmits the message to the device 408E. In one aspect, the devices 408 only directly communicate with the routers 402, 404, and do not route data messages to other devices 408. For example, the device 408A may communicate messages with the router 402, but not with other devices 408B-H without the data messages first traveling through the router 402 and/or the router 404. The communication of messages between the devices 408 through the routers 402, 404 and over the communication pathway 406 can be referred to as intra-consist routing.

In one embodiment, the devices 408 register with the routers 402, 404 in order to communicate the data messages. For example, the devices 408A-D may register with the router 402 so that the router 402 is aware of the devices 408A-D. The devices 408E-H can register with the router 404 so that the router 404 is aware of the devices 408E-H. When a router 402, 404 receives a message for one or more of the devices 408 that are registered with that router 402, 404, the router 402, 404 can convey the message to the registered device 408. In one embodiment, one router 402, 404 may be unaware of the devices 408 that are registered with the other router 402, 404. For example, the routers 402, 404 may only have information (e.g., a list) of which devices 408 are registered with that router 402, 404, and may not have the information of which devices 408 are registered with other routers 402, 404.

In one embodiment, one or more devices 408 have a processing capability (e.g., through hardware and/or software) to self-assess a status of the device 408. The status of the device 408 can include a determination of whether the device 408 is operational (e.g., capable of performing one or more desired functions), whether the device 408 is properly operating (e.g., outputs of the device 408 are within designated limits), and/or the health of the device 408 (e.g., whether repair or replacement of the device 408 is needed). Depending on this self-assessed status, the device 408 can send a status message to the associated router 402, 404 in order to inform the router 402, 404 that the device 408 is available to process network traffic (e.g., data messages communicated in the network) that is sent to the device 408. For example, if the status indicates that the device 408 is properly functioning, then the device 408 can send a message to the router 402, 404 to advertise that the device 408 is available for communication with the router 402, 404. The router 402, 404 may then register the device 408 with the router 402, 404. If the status indicates that the device 408 is not properly functioning, then no message is send to the associated router 402, 404 or a message is sent to the router 402, 404 indicating that the device 408 is not functioning properly. The router 402, 404 may then not register the device 408 with the router 402, 404 and/or may remove a previous registration of the device 408 with the router 402, 404.

One or more of the devices 408 may periodically re-evaluate itself by re-assessing the status of the device 408. It the self-assessment of the device 408 changes, the device 408 can inform the router 402, 404 that the device 408 can be registered or de-registered. For example, if the device 408 previously was registered to a router 402 or 404 and a later re-evaluated self-assessment of the device 408 indicates that the status of the device 408 has changed (indicating that the device 408 can no longer be used), then the device 408 can send a status message to the router 402 or 404 to inform the router 402 or 404 of the change in status. The router 402 or 404 may then de-register the device 408, such as by removing the device 408 from a locally stored list of registered devices 408, so that no additional messages (e.g., network traffic) is routed to the device 408 (unless and until the device 408 is later re-registered). If the device 408 previously was not registered to the router 402 or 404 and a later re-evaluated self-assessment of the device 408 indicates that the status of the device 408 has changed (indicating that the device 408 can be used), then the device 408 can send a status message to the router 402 or 404 to inform the router 402 or 404 of the change in status. The router 402 or 404 may then register the device 408, such as by adding the device 408 to the locally stored list of registered devices 408, so that messages (e.g., network traffic) can then routed to the device 408 (unless and until the device 408 is later de-registered).

In operation, the devices 408 may self-assess the statuses of the respective devices 408 and, based on this assessment, either send a status message to the associated router 402, 404 indicating that the device 408 is to be registered with the router 402, 404 or do not send the status message (or send a message indicating that the device 408 is not to be registered. Based on the status messages received, the routers 402, 404 register the devices 408. When the devices 408 are registered, the devices 408 may be assigned addresses, such as dynamic IP addresses. In one embodiment, the addresses of the devices 408 are known only to the router 402 or 404 to which the devices 408 are registered.

FIGS. 5 and 6 illustrate examples of registration lists 500, 600 of the respective routers 402, 404. The registration list 500 indicates which of the devices 408A-D are registered to the router 402 while the registration list 600 indicates which of the devices 408E-H are registered to the router 404. In the illustrated example, the devices 408A, 408C, and 408D are registered with the router 402 while the device 408B is not registered. The self-assessment of the devices 408A-D may have indicated that the devices 408A, 408C, and 408D are functioning properly and that the device 408B is not functioning properly. As a result, the devices 408A, 408C, and 408D send status messages to the router 402 to be registered while the device 408B does not send such a status message (or sends a status message indicating that the device 408B is not to be registered to the router 402). Additionally, the devices 408F-H are registered with the router 404 while the device 408E is not registered. The self-assessment of the devices 408E-H may have indicated that the devices 408F-H are functioning properly and that the device 408E is not functioning properly. As a result, the devices 408F-H send status messages to the router 404 to be registered while the device 408E does not send such a status message (or sends a status message indicating that the device 408E is not to be registered to the router 404).

The routers 402, 404 can assign addresses to the devices 408 that are registered to the routers 402, 404, as shown in the third column of the lists 500, 600. These addresses can be used by the routers 402, 404 to send network traffic (e.g., data messages) to the devices 408. In one embodiment, the addresses can include an indication or representation of the type of device 408 that is associated with the address, such as an indication of whether the device 408 is a radio, GPS receiver, or other device.

As one example of operation of the system 400, a first device (e.g., the device 408C) sends a data message to the first router with which the first device is registered (e.g., the router 402). The data message can include information, such as in a header of the message, indicating an intended recipient device of the message. For example, the data message may include an indication that the message is to be routed through the system 400 to a radio. If the router 402 has device 408 that is a radio and that is registered to the router 402 (e.g., the device 408A), then the router 402 can send the message to the radio. But, if the router 402 does not have the device 408 that is a radio registered with the router 402, then the router 402 may communicate with the router 404.

The first router 402 can send an inquiry message to the second router 404 that requests confirmation of whether the second router 404 has one or more radios registered with the second router 404. If one or more of the devices 408 registered with the second router 404 are a radio, then the second router 404 can send a confirmation message to the first router 402. The first router 402 may then send the data message from the device 408C to the second router 404. The second router 404 can receive the data message and refer to the registration list 600 to determine the local address of one or more of the registered devices 408F-H that are radios. The second router 404 can then send the data message to at least one of the registered devices 408F-H that is a radio.

Alternatively, the first router 402 can send the data message to the second router 404 without requesting confirmation of whether the second router 404 has one or more registered devices 408 that are radios. The second router 404 can receive the data message and examine the message to determine the type of device 408 that the data message is to be sent to. The second router 404 determines that the data message is to be sent to a radio and examines the list 600 of registered devices 408F-H to determine which of the registered devices 408F-H is a radio (such as by examining the addresses of the devices 408F-H). The second router 404 then conveys the data message to one or more of the registered devices 408F-H that is a radio.

If the second router 404 does not have any registered devices 408 that are radios, then the second router 404 can send the data message to another router and/or send a failure message back to the first router 402. The failure message can indicate that no radios are registered and available to process the data message.

Figure 7:
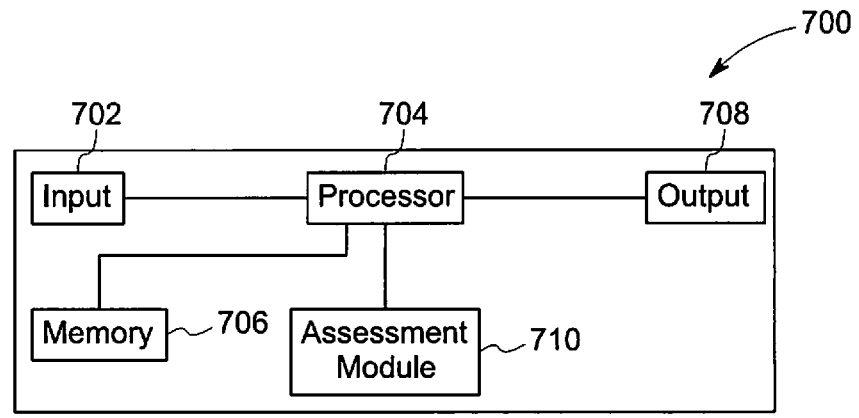
FIG. 7 is a schematic diagram of one embodiment of an operational device.

FIG. 7 is a schematic diagram of one embodiment of an operational device 700. The device 700 can represent one or more of the devices 408 (shown in FIG. 4). The device 700 includes an input 702 that receives information (e.g., data) from an external source. For example, the input 702 can be a sensor or a device connected with a sensor to receive sensed data, a touchscreen, microphone, button, switch, throttle, pedal, receiver, and the like. The device 700 also includes a processor 704, such as a computer processor, controller, or the like. The processor 704 operates based on hard-wired instructions and/or instructions stored in a tangible and non-transitory computer readable storage medium (e.g., memory 706) to process the data obtained by the input 702. For example, the processor 704 may receive data from the input 702. The processor 704 may examine the data and provide an output signal to an output 708, such as a geographic location, a speed of the consist, a temperature, an audio signal, and the like. The output 708 can be a device that communicates the output signal to another device, such as one or more of the other devices 408 via the system 400. For example, the output 708 can generate the data message that is routed to another device 408 via the routers 402, 404 and communication pathway 406.

The device 700 also includes an assessment module 710. As used herein, the term "module" may include hardware (e.g., circuitry, controllers, processors, and the like) and/or software (e.g., one or more sets of instructions stored on a tangible and non-transitory computer readable storage medium such as a computer accessible memory) that perform one or more operations. For example, the assessment module 710 may represent hardware and/or software that receives an audio signal or spectrogram for analysis and separation into separate audio signals and/or components, such as a microphone or other input device. In one embodiment, the module 710 can represent a tangible and computer-readable storage medium (e.g., a computer hard drive or other memory) that has one or more sets of instructions. These sets of instructions can direct hardware (e.g., a processor of a computer) to perform various functions, such as the operations described herein.

The assessment module 710 performs the self-assessment of the device 700. For example, the assessment module 710 can examine the device 700 (including the input 702, output 708, memory 706, and/or processor 706) to determine a health indication, status indication, and/or capability indication. The health indication represents the condition of the device 700. Devices 700 that are in poor condition (e.g., due to damage, age, neglect, and the like) have relatively low health indications while devices 700 that are in good condition (e.g., due to a lack of damage, young age, frequency repair and/or maintenance, and the like) have greater health indications. The status indication represents an operating state of the device 700. For example, the status indication can represent if the device 700 is in an off or inoperative state, or is in an on or operative state. The status indication can represent a priority of the device 700 relative to one or more other devices 408. For example, a higher priority may mean that the device 700 is to process data messages before devices 408 with lower priorities.

The capability indication represents whether the device 700 is able to perform one or more designated functions. The capability indication can be used to determine if a device 700 is malfunctioning, even if the health indication and/or status indication represent that the device 700 is in good working order. For example, the assessment module 710 can examine how the processor 706 processes data received via the input 702, the data that is sent from the output 708, differences between the data that is received by the input 702 and that is sent from the output 708, and the like, to determine whether the device 700 is functioning properly.

For example, if the device 700 represents a GPS receiver, then the assessment module 710 may examine data that is sent from the processor 706 to the output 708 to determine if the data appears to be accurate. Data that appears to be accurate can include data that indicates that the receiver is receiving data from at least a designated number of GPS satellites (such as two or more satellites). Data that appears to be inaccurate can include data that indicates that the receiver is receiving data from a lesser number of satellites. Data that appears to be accurate can include data that represents possible locations of the device 700, such as locations disposed along the track being traveled by a rail vehicle consist. Data that appears to be inaccurate can include data that represents other locations of the device 700, such as locations that could not be reached by the consist.

As another example, if the device 700 represents a temperature sensor, then the assessment module 710 may examine data that is sent from the processor 706 to the output 708 to determine if the data appears to be accurate. Data that appears to be accurate can include data that represents temperatures within a range of commonly experienced temperatures by the device 700 and/or by similar devices. Data that appears to be inaccurate can include data that represents temperatures that are not frequency sensed by the device 700 and/or by similar devices.

As another example, if the device 700 represents an antenna or a device having an antenna (e.g., as the input 702), then the assessment module 710 may examine the reflected current of the antenna. If the reflected current is at least a designated amount of current, then the assessment module 710 may indicate that the device 700 is functioning properly. If the reflected current is not at least the designated amount of current, then the assessment module 710 may indicate that the device 700 is not functioning properly.

Based on the assessment performed by the assessment module 710, the module 710 examines the indications from the assessment and determines whether the device 700 is functioning properly. If the device 700 is not functioning properly, then the assessment module 710 may not send a status message to the router 402, 404 (e.g., via the output 708) and/or may send a status message to the router 402, 404 that indicates that the device 700 is not to be registered. Alternatively, the assessment module 710 may direct the processor 704 to send the status message. As described above, the device 700 may or may not be registered by the router 402 or 404 based on the results of the assessment.

In another embodiment, the assessment module 710 may perform the assessment of another device. For example, the assessment module 710 in a first device (e.g., device 408A) may assess the state, health, and/or capability of a second device (e.g., device 408B). Based on this assessment, the assessment module 710 can send a status message (or direct the processor 706 to send the status message) to the router 402 or 404 so that the second device may or may not be registered, as described above.

Figure 8:
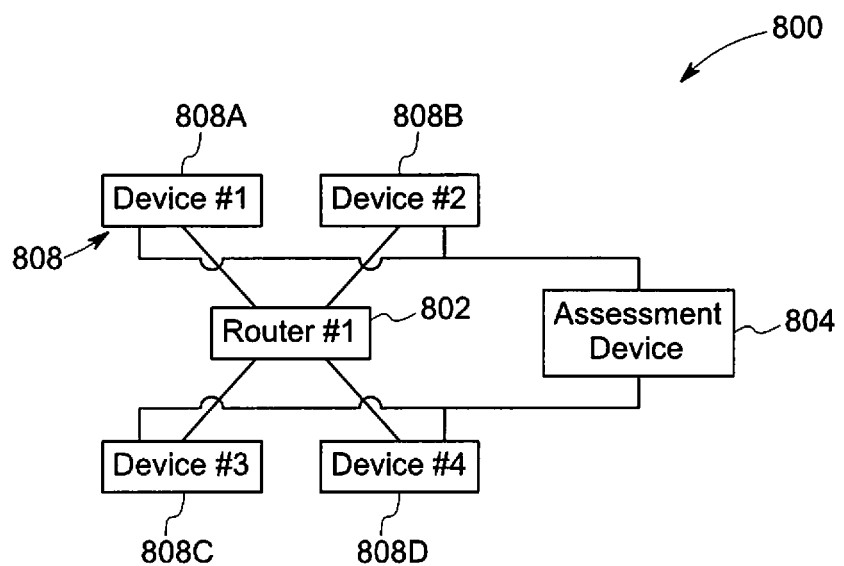
FIG. 8 is a schematic diagram of one example of a part of a communication system.

FIG. 8 is a schematic diagram of one example of a part of a communication system 800. The portion of the communication system 800 shown in FIG. 8 may represent part of the communication system 400 (shown in FIG. 4), such as the local network 410 (shown in FIG. 4). In FIG. 8, the devices 808 (e.g., "Device #1," "Device #2," "Device #3," and "Device #4") can represent the devices 408A-D (shown in FIG. 4), respectively. A router 802 (e.g., "Router #1") can represent the router 402 (shown in FIG. 4).

An assessment device 804 includes a device having the assessment module 710 (shown in FIG. 7). The assessment device 804 can be communicatively coupled with the devices 808 so that the assessment device 804 can remotely examine the functionality of the devices 808. By "remotely," it is meant that the assessment device 804 is separate from, and not included within, the devices 804 that are examined by the assessment device 804. The assessment device 804 can assess the functionality of the devices 808, similar to as described above in connection with the assessment module 710 in FIG. 7. Based on this assessment, the assessment device 804 can communicate one or more status messages to the router 802. The status messages can inform the router 802 as to which devices 804 are to be registered with the router 802.

Figure 9:
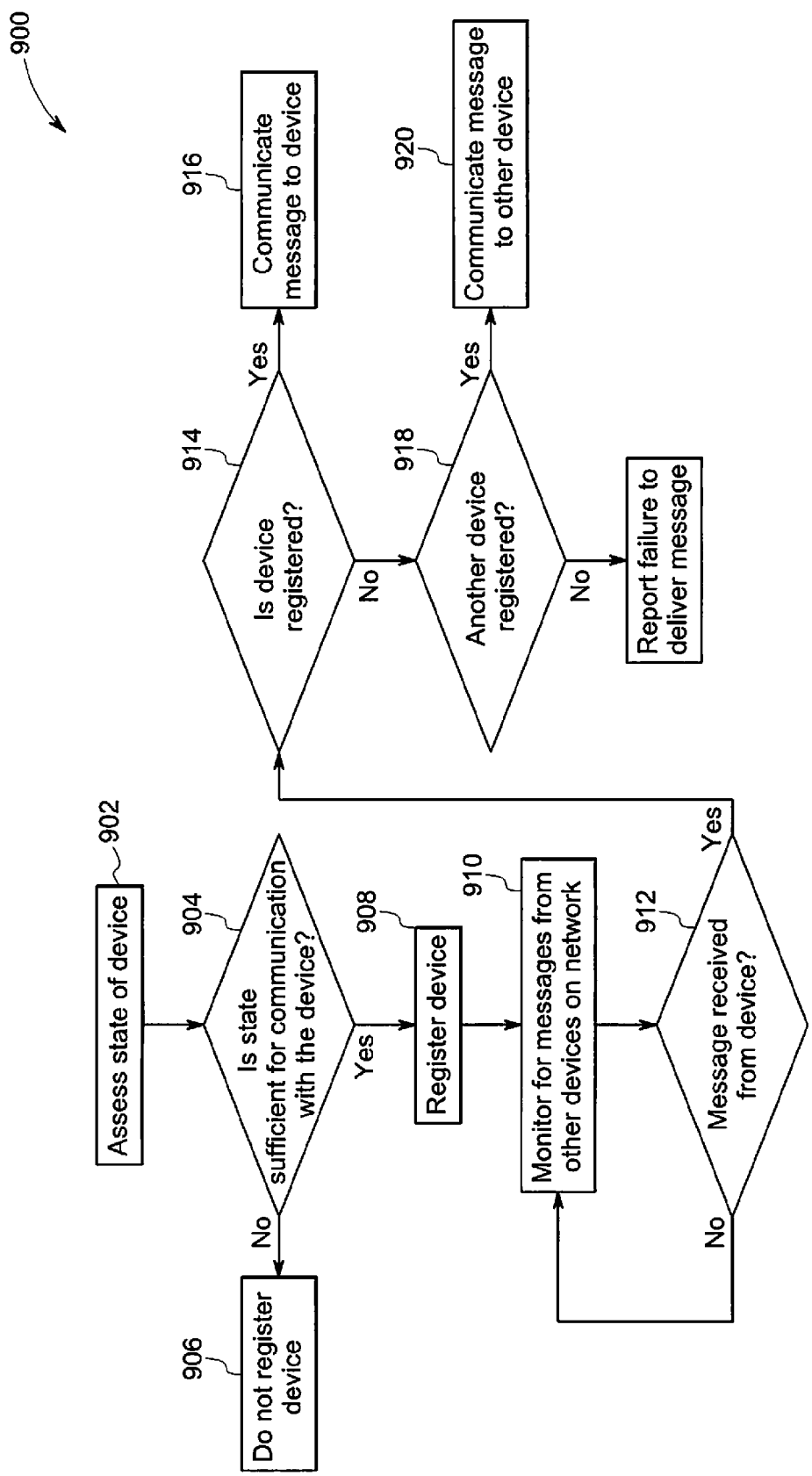
FIG. 9 illustrates a flowchart of one embodiment of a method 900 for communicating in a vehicle consist.

FIG. 9 illustrates a flowchart of one embodiment of a method 900 for communicating in a vehicle consist. The method 900 may be used to communicate data messages within the system 400 shown in FIG. 4. At 902, a state of a device is assessed. For example, the devices 408 (shown in FIG. 4) may self-assess the health, status, and/or capability of the devices 408 to perform designated functions. Additionally or alternatively, one or more of the devices 408 may assess other devices 408. In one aspect, an assessment device (e.g., the device 804 shown in FIG. 8) can perform the assessments of the devices 408.

At 904, a determination is made as to whether the state of the device (e.g., the health, status, and/or capability of the device 408) is sufficient for communication with the device so that the device can process network traffic (e.g., process data messages). For example, a determination is made as to whether a device 408 can accurately process data that is communicated to the device 408 in order to properly perform one or more operations to be performed by the device 408. If the state of the device 408 indicates that the device 408 cannot perform the operations, then the device 408 cannot be registered. As a result, flow of the method 900 proceeds to 906. Otherwise, if the state of the device 408 indicates that the device 408 can perform the operations, then the device 408 can be registered. As a result, flow of the method 900 proceeds to 908.

At 906, the device is not registered with a router. For example, the device 408 may not be registered with the router 402 or 404 (shown in FIG. 4) that is associated with (e.g., disposed onboard) the same vehicular unit 18 (shown in FIG. 1) that the device 408 is disposed on. At 908, the device is registered with the router. As described above, the router can assign an address to the device or otherwise keep track of the registration of the device.

At 910, the network is monitored to determine if messages for one or more of the devices are received. For example, the routers 402, 404 may operate to receive data messages from each other and/or from one or more data messages.

At 912, a determination is made as to whether a router receives a message addressed to a device. The message may be addressed to a specific device (e.g., a radio disposed onboard a designated vehicular unit 18) or to a type of device (e.g., a radio disposed onboard any of the vehicular units 18). If such a message is received, flow of the method 900 continues to 914. Otherwise, flow of the method 900 returns to 910.

At 914, a determination is made as to whether the device that is addressed by the message is registered with the router. For example, the data message that is received at a router can be examined to determine which specific device or which type of device the message is addressed to. In one embodiment, a recipient address included in the message can be compared to the list of registered devices at the router. If the recipient address matches one or more of the addresses of the registered devices, then the message can be sent to the device. As a result, flow of the method 900 continues to 916. On the other hand, if the recipient address does not match the addresses of the registered devices, then the message may not be able to be sent to any of the devices. As a result, flow of the method 900 continues to 918.

At 916, the message is communicated to the addressed and registered device. For example, the router 402, 404 that received the message can transmit the data message to the addressed device 408.

At 918, a determination is made as to whether there is another device that is registered with the router and that is the same type of device as the device that is addressed by the message. For example, if the device that is addressed by the message is a radio but is not registered with the router, then the devices that are registered can be examined in order to determine if one or more of the registered devices are a radio. If there is another device that is both registered and the same type of device, the message may be able to be communicated to the other device. As a result, flow of the method 900 can continue to 920. On the other hand, if there is not another device that is both registered and the same type of device, or if the message can only be sent to a single specific device (and not to another device that is the same type of device as the addressed device), the message may not be able to be communicated to the other device. As a result, flow of the method 900 can continue to 922.

At 920, the message is communicated to the registered device that is the same type of device as the addressed device. For example, the router 402, 404 that received the message can transmit the data message to the device 408C that is the same type of device as the addressed but unregistered device 408B. In one embodiment, the message may be conveyed to another router that can determine if another device that is the same type of device as the addressed device is registered. The message may be communicated to the other device by this additional router.

At 922, the message is not communicated to any of the devices that are registered. The failure to deliver the message may be reported to the device that sent the data message and/or the router to which the device is connected. For example, the router that was unable to convey the message to the addressed device or to another device that is the same type of device as the addressed device may transmit a failure message back to the device that originated the message.

In one embodiment, a method (e.g., for communicating in a vehicle consist) includes determining a state of one or more operational devices in a second group of operational devices. The second group of operational devices is coupled with a second router disposed onboard a second vehicular unit of a vehicle consist. The method also includes registering at least one of the operational devices in the second group with the second router based on the state that is determined and transmitting a data message from at least one operational device in a first group of operational devices to the second router via a first router and a communication pathway of the vehicle consist. The first group of operational devices is coupled with the first router disposed onboard a first vehicular unit of the vehicle consist. The operational devices in the first and second groups are configured to perform one or more functions of the respective first vehicular unit and second vehicular unit. The first and second routers are connected with each other by the communication pathway. The method also includes communicating the data message to the at least one of the operational devices in the second group that are registered with the second router.

In one aspect, the data message is communicated to the at least one of the operational devices in the second group only when the data message is both addressed to the at least one of the operational devices in the second group and the at least one of the operational devices in the second group are registered with the second router.

In one aspect, the state of the one or more operational devices in the second group is indicative of at least one of a health of the one or more operational devices in the second group, a status of the one or more operational devices in the second group, or a capability of the one or more operational devices in the second group to perform the one or more functions of the second vehicular unit.

In one aspect, the communication pathway is a multiple unit (MU) bus of a rail vehicle consist. The rail vehicle consist includes the first vehicular unit and the second vehicular unit.

In one aspect, determining the state of the one or more of the operational devices in the second group is autonomously performed by a self-assessment of the one or more of the operational devices in the second group.

In one aspect, determining the state of the one or more of the operational devices in the second group is autonomously performed by one or more other operational devices in the second group.

In one aspect, determining the state of the one or more of the operational devices in the second group is autonomously performed by an assessment device disposed onboard the second vehicular unit.

In one aspect, registering the at least one of the operational devices in the second group with the second router includes assigning an address to the at least one of the operational devices in the second group.

In another embodiment, a method (e.g., for communicating in a vehicle consist) includes determining a state of an operational device that is coupled with a first router disposed onboard a first vehicular unit of a vehicle consist. The operational device is configured to perform one or more functions of the first vehicular unit. The first router is connected with a second router disposed onboard a second vehicular unit of the vehicle consist by a communication pathway of the vehicle consist. The method also includes registering the operational device with the first router when the state indicates that the operational device can perform the one or more functions, receiving a data message at the first router from the second router via the communication pathway, and communicating the data message to the operational device when the operational device is registered with the first router.

In one aspect, the data message is communicated to the operational device only when the data message is both addressed to the operational device and the operational device is registered with the first router.

In one aspect, the state of the operational device is indicative of at least one of a health of the operational device, a status of the operational device, or a capability of the operational device to perform the one or more functions.

In one aspect, the vehicle consist is a rail vehicle consist and the communication pathway is a multiple unit (MU) bus of the rail vehicle consist.

In one aspect, determining the state of the operational device is autonomously performed by the operational device.

In one aspect, determining the state of the operational device is autonomously performed by another device disposed onboard the first vehicular unit.

In one aspect, registering the operational device includes assigning an address to the operational device.

In one embodiment, a system (e.g., a communication system of a vehicle consist) includes first and second routers. The first router is configured to be coupled with a first group of operational devices disposed onboard a first vehicular unit of a vehicle consist. The first group of operational devices is configured to perform one or more functions of the first vehicular unit. The second router is configured to be coupled with a second group of operational devices disposed onboard a second vehicular unit of the vehicle consist. The second group of operational devices is configured to perform one or more functions of the second vehicular unit. The first and second routers are configured to be connected with each other by a communication pathway of the vehicle consist. The second router is configured to determine a state of one or more of the operational devices in the second group and to register at least one of the operational devices in the second group with the second router based on the state that is determined. The first router is configured to transmit a data message from at least one of the operational devices in the first group to the second router via the communication pathway and the second router is further configured to communicate the data message to the at least one of the operational devices in the second group that are registered with the second router.

In one aspect, the second router is configured to communicate the data message to the at least one of the operational devices in the second group only when the data message is both addressed to the at least one of the operational devices in the second group and the at least one of the operational devices in the second group are registered with the second router.

In one aspect, the state of the one or more operational devices in the second group is indicative of at least one of a health of the one or more operational devices, a status of the one or more operational devices, or a capability of the one or more operational devices to perform the one or more functions of the second vehicular unit.

In one aspect, the communication pathway is a multiple unit (MU) bus of a rail vehicle consist.

In one aspect, the state of the one or more of the operational devices in the second group is autonomously determined by a self-assessment of the one or more of the operational devices.

In one aspect, the state of the one or more of the operational devices in the second group is autonomously determined by one or more other operational devices in the second group.

In one aspect, the system also includes an assessment device that is configured to be disposed onboard the second vehicular unit and that is configured to autonomously determine the state of the one or more of the operational devices in the second group.

In one aspect, the second router is configured to register the at least one of the operational devices in the second group by assigning an address to the at least one of the operational devices.

In another embodiment, a system (e.g., a communication system for a vehicle consist) includes a first router configured to be disposed onboard a first vehicular unit of the vehicle consist and to be coupled with an operational device that is configured to perform one or more functions of the first vehicular unit. The first router is configured to be connected with a second router disposed onboard a second vehicular unit of the vehicle consist by a communication pathway of the vehicle consist. The first router also is configured to obtain a state of the operational device, register the operational device when the state indicates that the operational device can perform the one or more functions, receive a data message from the second router via the communication pathway, and communicate the data message to the operational device when the operational device is registered.

In one aspect, the first router is configured to communicate the data message to the operational device only when the data message is both addressed to the operational device and the operational device is registered with the first router.

In one aspect, the state of the operational device is indicative of at least one of a health of the operational device, a status of the operational device, or a capability of the operational device to perform the one or more functions.

In one aspect, the vehicle consist is a rail vehicle consist and the communication pathway is a multiple unit (MU) bus of the rail vehicle consist.

In one aspect, the state of the operational device is autonomously determined by the operational device and reported to the first router.

In one aspect, the state of the operational device is autonomously determined by another device disposed onboard the first vehicular unit.

In one aspect, the first router is configured to register the operational device by assigning an address to the operational device.

In another embodiment, a method (e.g., for communicating in a vehicle consist) includes determining a state of a first operational device disposed onboard a first vehicular unit of a vehicle consist. The state is indicative of at least one of a health of the first operational device, a status of the first operational unit, or a capability of the first operational unit to perform one or more functions of the first vehicular unit. The method also includes reporting the state of the first operational device to a first router that is connected with the first operational device. The first router is communicatively coupled with a second router disposed on a second vehicular unit of the vehicle consist by a communication pathway. The method also includes, at the first operational device, receiving a data message that is communicated from the second router to the first router when the first operational device is registered with the first router. The first operational device is registered based on the state of the first operational device.

In one aspect, determining the state of the first operational device is performed by the first operational device.

In one aspect, determining the state of the first operational device is performed by a second operational device disposed onboard the first vehicular unit.

In one aspect, determining the state of the first operational device is performed by an assessment device disposed onboard the first vehicular unit.

In one aspect, the method also includes receiving an assigned address for the first operational device based on the state of the first operational device. The assigned address is used to communicate the message to the first operational device.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A method comprising:
  determining an operative state of one or more operational devices in a second group of operational devices, wherein the second group of operational devices are coupled with a second router disposed onboard a second vehicular unit of a vehicle consist;
  based on the operative state that is determined, communicating a registration message from the one or more operational devices to the second router;
  responsive to receiving the registration message at the second router, registering at least one of the operational devices in the second group with the second router based on the operative state that is determined using the second router, wherein registering the at least one of the operational devices in the second group includes assigning one or more network addresses to the at least one of the operational devices in the second group;
  communicating a data message from at least one operational device in a first group of operational devices to the second router via a first router and a communication pathway of the vehicle consist, wherein the first group of operational devices is coupled with the first router disposed onboard a first vehicular unit of the vehicle consist, and wherein the operational devices in the first and second groups are configured to perform one or more functions of the respective first vehicular unit and second vehicular unit, the first and second routers connected with each other by the communication pathway; and
  communicating the data message to the at least one of the operational devices in the second group that are registered with the second router based on the one or more network addresses that are assigned.

2. The method of claim 1, wherein the data message is communicated to the at least one of the operational devices in the second group only when the data message is both addressed to the at least one of the operational devices in the second group and the at least one of the operational devices in the second group are registered with the second router.

3. The method of claim 1, wherein the operative state of the one or more operational devices in the second group is indicative of at least one of a health of the one or more operational devices in the second group, a status of the one or more operational devices in the second group, or a capability of the one or more operational devices in the second group to perform the one or more functions of the second vehicular unit.

4. The method of claim 1, wherein the communication pathway is a multiple unit (MU) bus of a rail vehicle consist, the rail vehicle consist comprising the first vehicular unit and the second vehicular unit.

5. The method of claim 1, wherein determining the operative state of the one or more of the operational devices in the second group is autonomously performed by a self-assessment of the one or more of the operational devices in the second group.

6. The method of claim 1, wherein determining the operative state of the one or more of the operational devices in the second group is autonomously performed by one or more other operational devices in the second group.

7. The method of claim 1, wherein determining the operative state of the one or more of the operational devices in the second group is autonomously performed by an assessment device disposed onboard the second vehicular unit.

8. A method comprising:
  determining an operative state of an operational device that is coupled with a first router disposed onboard a first vehicular unit of a vehicle consist, the operational device configured to perform one or more functions of the first vehicular unit, the first router connected with a second router disposed onboard a second vehicular unit of the vehicle consist by a communication pathway of the vehicle consist;

communicating a registration message from the operational device to the first router responsive to the operative state indicating that the operational device can perform the one or more functions;
registering, by the first router, the operational device with the first router responsive to the first router receiving the registration message, wherein registering the operational device includes assigning a network address to the operational device;
receiving a data message at the first router from the second router via the communication pathway; and
communicating the data message to the operational device responsive to the operational device being registered with the first router and having the network address assigned to the operational device.

9. The method of claim 8, wherein the data message is communicated to the operational device only when the data message is both addressed to the operational device and the operational device is registered with the first router.

10. The method of claim 8, wherein the operative state of the operational device is indicative of at least one of a health of the operational device, a status of the operational device, or a capability of the operational device to perform the one or more functions.

11. The method of claim 8, wherein the vehicle consist is a rail vehicle consist, and wherein the communication pathway is a multiple unit (MU) bus of the rail vehicle consist.

12. The method of claim 8, wherein determining the operative state of the operational device is autonomously performed by the operational device.

13. The method of claim 8, wherein determining the operative state of the operational device is autonomously performed by another device disposed onboard the first vehicular unit.

14. A system comprising:
a first router configured to be disposed onboard a first vehicular unit of a vehicle consist and to be coupled with an operational device that is configured to perform one or more functions of the first vehicular unit, the first router configured to be connected with a second router disposed onboard a second vehicular unit of the vehicle consist by a communication pathway of the vehicle consist;
wherein the first router is configured to obtain an operative state of the operational device, register the operational device responsive to the operative state indicating that the operational device can perform the one or more functions, assign a network address to the operational device responsive to registering the operational device, receive a data message from the second router via the communication pathway, and communicate the data message to the operational device using the network address that is assigned responsive to the operational device being registered.

15. The system of claim 14, wherein the first router is configured to communicate the data message to the operational device only when the data message is both addressed to the operational device and the operational device is registered with the first router.

16. The system of claim 14, wherein the operative state of the operational device is indicative of at least one of a health of the operational device, a status of the operational device, or a capability of the operational device to perform the one or more functions.

17. The system of claim 14, wherein the vehicle consist is a rail vehicle consist, and the communication pathway is a multiple unit (MU) bus of the rail vehicle consist.

18. The system of claim 14, wherein the operative state of the operational device is autonomously determined by the operational device and reported to the first router.

19. The system of claim 14, wherein the operative state of the operational device is autonomously determined by another device disposed onboard the first vehicular unit.

20. The system of claim 14, further comprising an assessment device configured to determine the operative state of the operational device, the assessment device also configured to instruct the first router to de-register the operational device to prevent one or more additional data messages from being communicated from the first router to the operational device.

21. The system of claim 14, wherein the first router is configured to register the operational device only responsive to the first router receiving an advertisement from the operational device indicating an availability of the operational device to perform the one or more functions.

22. The system of claim 14, wherein the first router is configured to assign the network address to the operational device such that the network address includes an indication of a type of the operational device.

23. The system of claim 14, wherein, prior to communicating the data message to the operational device from the first router, the first router is configured to receive an inquiry message from the second router that identifies a type of operational devices to which the data message is directed, and the first router is configured to communicate a confirmation message to the second router that responds to the inquiry message responsive to the operational device being the type of operational devices identified in the inquiry message and the operational device being registered with the first router.

24. A method comprising:
determining an operative state of a first operational device disposed onboard a first vehicular unit of a vehicle consist, the operative state indicative of at least one of a health of the first operational device, a status of the first operational unit, or a capability of the first operational unit to perform one or more functions of the first vehicular unit;
reporting the operative state of the first operational device to a first router that is connected with the first operational device, the first router communicatively coupled with a second router disposed on a second vehicular unit of the vehicle consist by a communication pathway;
registering the first operational device with the first router by assigning a network address to the first operational device; and
at the first operational device, receiving a data message that is communicated from the second router to the first router when the first operational device is registered with the first router, the first operational device being registered based on the state of the first operational device, wherein the data message is communicated from the first router to the first operational device using the network address that is assigned.

25. The method of claim 24, wherein determining the operative state of the first operational device is performed by the first operational device.

26. The method of claim 24, wherein determining the operative state of the first operational device is performed by a second operational device disposed onboard the first vehicular unit.

27. The method of claim 24, wherein determining the operative state of the first operational device is performed by an assessment device disposed onboard the first vehicular unit.

* * * * *